(12) United States Patent
Stevens et al.

(10) Patent No.: US 11,537,453 B2
(45) Date of Patent: Dec. 27, 2022

(54) MULTITHREADED LOSSY QUEUE PROTOCOL

(71) Applicant: Target Brands, Inc., Minneapolis, MN (US)

(72) Inventors: Luis F. Stevens, San Jose, CA (US); Hrishikesh V. Prabhune, Sunnyvale, CA (US); Christopher Fretz, Harleysville, PA (US)

(73) Assignee: Target Brands, Inc., Minneapolis, MN (US)

( * ) Notice: Subject to any disclaimer, the term of this patent is extended or adjusted under 35 U.S.C. 154(b) by 9 days.

(21) Appl. No.: 16/834,872

(22) Filed: Mar. 30, 2020

(65) Prior Publication Data

US 2021/0303375 A1    Sep. 30, 2021

(51) Int. Cl.
*G06F 9/54* (2006.01)

(52) U.S. Cl.
CPC .............. *G06F 9/544* (2013.01); *G06F 9/546* (2013.01); *G06F 2209/548* (2013.01)

(58) Field of Classification Search
CPC ..... G06F 9/544; G06F 9/546; G06F 2209/548
See application file for complete search history.

(56) References Cited

U.S. PATENT DOCUMENTS

| | | | | |
|---|---|---|---|---|
| 5,974,483 | A * | 10/1999 | Ray .......................... | G06F 5/10 710/52 |
| 8,086,769 | B2 | 12/2011 | Arndt | |
| 8,099,546 | B2 | 1/2012 | Rostedt | |
| 10,152,275 | B1 * | 12/2018 | Tsirkin ................... | G11C 21/00 |
| 2009/0204755 | A1 * | 8/2009 | Rushworth ............. | G06F 9/526 711/110 |
| 2010/0312975 | A1 * | 12/2010 | Rostedt ..................... | G06F 5/10 711/155 |
| 2014/0282622 | A1 * | 9/2014 | Frazier .................. | G06F 11/348 719/318 |
| 2014/0334800 | A1 * | 11/2014 | Schmitt ................ | H04N 9/8042 386/270 |
| 2017/0249101 | A1 * | 8/2017 | Sofia ..................... | G06F 3/0653 |
| 2019/0065371 | A1 * | 2/2019 | Tsirkin ................ | G06F 12/0891 |

OTHER PUBLICATIONS

Rostedt, Steven, Lockless Ring Buffer Design, 16 Pages, 2009 Red Hat Inc., License: The GNU Free Documentation License, Version 1.2 (dual licensed under the GPL v2).
JAVA—Is there a fixed sized queue which removes excessive elements?; Stack Overflow—Public Search, 11 Pages, Dated: Apr. 25, 2019.
Rich Fitz John—Ring—The environment buffer ring buffer env; 24 Pages; Dated: Apr. 24, 2017.

* cited by examiner

*Primary Examiner* — S. Sough
*Assistant Examiner* — Kimberly L Jordan
(74) *Attorney, Agent, or Firm* — Merchant & Gould P.C.

(57) ABSTRACT

Methods and systems for managing a circular queue, or ring buffer, are disclosed. One method includes storing data from a producer into the ring buffer, and receiving a data read request from a consumer from among a plurality of consumers subscribed to read data from the ring buffer. After obtaining data from a location in the ring buffer in response to the data read request, it is determined if the location has been overrun by the producer. If it is determined that the location has been overrun by the producer, the data is discarded by the consumer. Otherwise, the data is consumed. Depending on the outcome, a miss counter or a read counter may be incremented.

20 Claims, 6 Drawing Sheets

MULTITHREADED LOSSY QUEUE PROTOCOL

BACKGROUND

Queue structures may be used to temporarily store data that is provided from a provider process to a consumer process. Typically, queue structures are sized to ensure that any foreseeable amount of data that might be provided to the consumer process can be stored for an adequate amount of time to allow the consumer process to read and consume that data. In some instances, producer and consumer processes may each monitor the extent of usage of the queue; when the queue usage approaches its capacity, either additional resources are obtained, or a producer may delay in providing additional data to the queue, while a consumer process may prioritize consumption of queued data (to reduce the amount of queued data more quickly). By contrast, where a queue never approaches capacity, the queue may be considered inefficient usage of storage space.

SUMMARY

In general, the present disclosure relates to a queue and queueing protocol that is specifically adapted for use in multithreaded applications in which producer data stored to a queue may be accessed by multiple consumers. In particular, a circular queue and related protocol are provided in which a consumer attempting in-order consumption of data from the queue is overtaken by a producer writing data to the queue, thereby invalidating the data read by the consumer from at least the portion of the queue designated as overwritten by the producer.

In an example aspect, a system includes one or more processors and a memory storing instructions that, when executed by one or more processors, cause the one or more processors to: store, in a ring buffer in the memory, data from a producer; receive a data read request from a consumer from among a plurality of consumers subscribed to read data from the ring buffer; and after obtaining data from a location in the ring buffer in response to the data read request, determine if the location has been overrun by the producer. If it is determined that the location has been overrun by the producer, the consumer will discard the data. If it is determined that the location has not been overrun by the producer, the consumer will consume the data.

In a second aspect, a method includes storing, in a circular queue, data from a producer, and receiving a data read request from a consumer from among a plurality of consumers subscribed to read data from the circular queue. The method further includes copying data from a location in the circular queue that is adjacent to last-read data by the consumer, and, after copying the data in response to the data read request, determining whether the location has been overrun by the producer. The method includes, upon determining that the location has not been overrun by the producer, consuming the data and incrementing a read counter.

In a third aspect, a system includes one or more processors and a memory storing instructions executable by the one or more processors. The instructions cause the one or more processors to: store, in a ring buffer in the memory, data from a producer at a location between a producer base index pointer and a producer reserve index pointer; and receive a data read request from a consumer from among a plurality of consumers subscribed to read data from the ring buffer, the data read request identifying data in the ring buffer adjacent to a consumer base index pointer. The instructions further cause the one or more processors to, after obtaining data from a location in the ring buffer between the consumer base index pointer and a consumer reserve index pointer in response to the data read request, determine if the location has been overrun by the producer by comparing the consumer base index pointer to the producer reserve index pointer. If it is determined that the location has been overrun by the producer, the consumer discards the data. If it is determined that the location has not been overrun by the producer, the consumer will consume the data.

BRIEF DESCRIPTION OF THE DRAWINGS

The same number represents the same element or same type of element in all drawings.

DETAILED DESCRIPTION

As briefly described above, embodiments of the present invention are directed to a memory structure and queueing protocol for queueing data to be handled by any of a number of potential subscribers (also referred to as consumers) in a publisher-subscriber model. In general, the queueing protocol is particularly usable in a multi-threaded scenario in which multiple subscribers may operate independently, but which are able to view all data published by the publisher. In a high-performance, high-throughput data consumption context, a position in a circular queue of a subscriber may be overrun where the publisher is able to publish more data than can be consumed by that subscriber. For example, a particular subscriber may be hung or stalled, and therefore cannot continue to consume data stored in the queue by the publisher. In accordance with the present disclosure, a multi-threaded queueing protocol allows data to be dropped or invalidated from a queue structure to allow for continued operation of the system overall without requiring either (1) all threads or (2) at least the publisher to wait for the lagging subscriber/consumer to complete its data consumption task(s).

In accordance with some aspects of the present disclosure, a computing system may implement a circular queue, or ring buffer, in memory. Data from a producer may be stored in that ring buffer by the producer; the producer will maintain index values into the queue identifying the last successfully written location (e.g., a base index) and an area currently being written (a reserve index). A plurality of consumers may access the queue (e.g., data accesses also being referred to as read requests). For a given consumer, after obtaining data from the queue, the consumer can assess whether the location of that data has been overrun by the producer. If overrun, the data is discarded; however, if not overrun, the consumer may proceed to consume the data. Accordingly, by waiting until data is fully received by the consumer, causes the decision point for the consumer to determine if it has been overrun to be made reliably, and in a manner that the consumer data will not subsequently be overwritten/invalidated. Still further, in multithreaded arrangements, rather than determining whether it is appropriate for a producer to write data into the queue and stalling the producer if such a write would overtake a consumer, each consumer monitors its own progress, thereby dispersing the overhead required to perform checks of valid data across the plurality of consumers.

Example Environment

Figure 1:
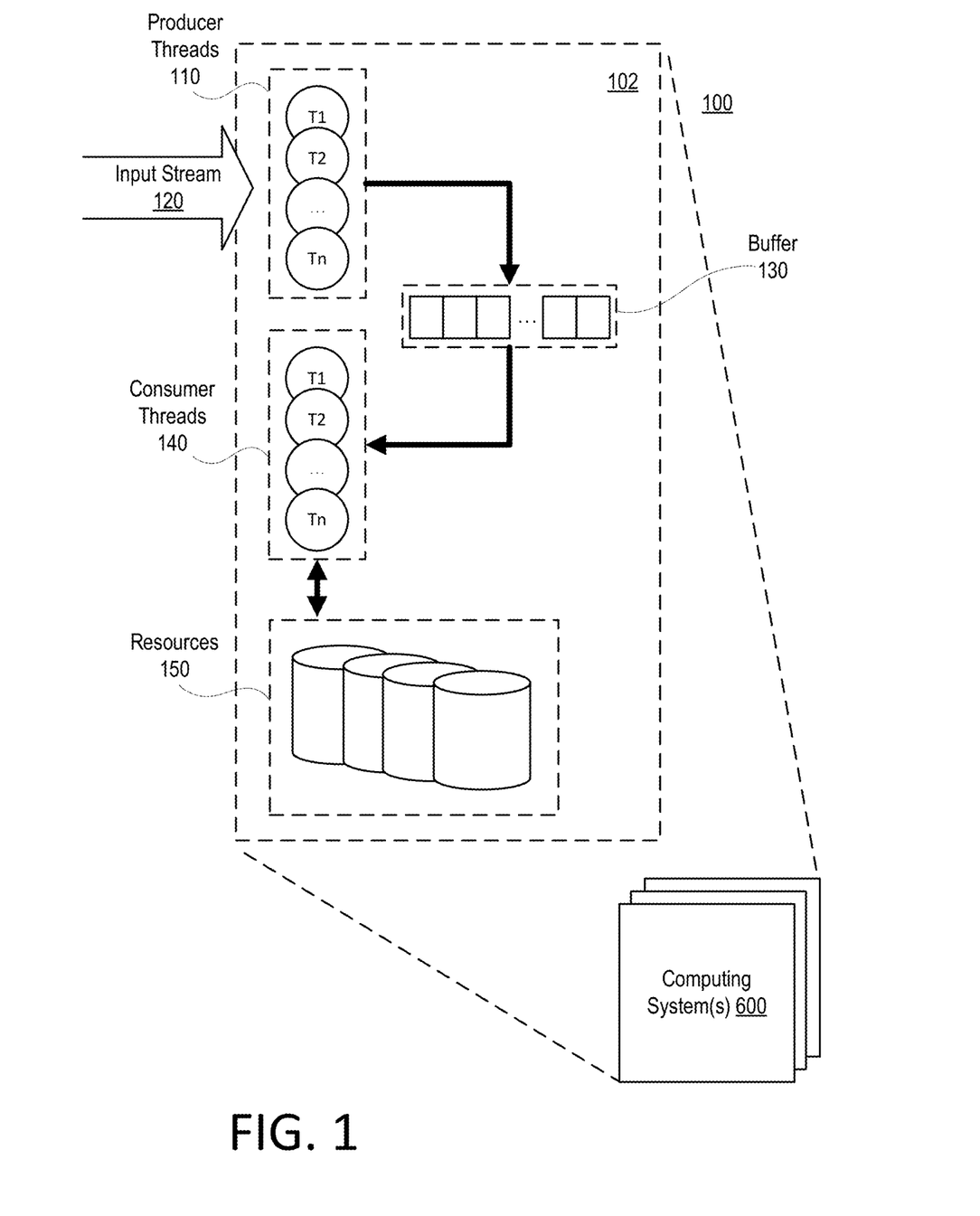
FIG. 1 illustrates an example computing environment that can benefit from use of technologies described herein.

FIG. 1 illustrates an example computing environment 100 that can benefit from use of technologies described herein. The computing environment 100 is provided by one or more computing systems 600 (described in more detail in FIG. 6). In many examples, the one or more computing system 600 are each one more physical or virtual computers having memory and one or more processors configured to execute instructions stored in the memory. The one or more computing systems 600 can be configured for particular tasks. In an example, the computing systems 600 can be high-performance computing systems having special-purpose hardware. The special-purpose hardware can include server- or workstation-grade CPUs (Central Processing Units) supporting high core counts, supporting large amounts of system memory, having large caches, having error correcting capabilities, other features, or combinations thereof. The special purpose hardware can include GPUs (Graphics Processing Units), AI (Artificial Intelligence) accelerating hardware (e.g., AI-focused processors or co-processors), error-correcting memory, other hardware, or combinations thereof. Further, one or more features can be provided as physical or virtual machines.

The computing environment 100 includes a producer-consumer workflow 102 having one or more producer threads 110 running on the one or more computing systems 600 (e.g., in parallel). The producer threads 110 each produce data to a buffer 130 for consumption by one or more consumer threads 140. In the illustrated example, the producer threads 110 produce data based, in part, on an input stream 120. The consumer threads 140 run on the one or more computing systems (e.g., in parallel), remove data from the buffer 130, and process the data to produce a result. During this process, one more resources 150 can be used by the consumer threads 140. The one or more resources 150 can include one or more databases, data structures, or other resources. The resources 150 may, but need not, be provided by the one or more computing systems 600 (e.g., one or more of the resources can be provided by a remote server or other computer).

In example implementations, the buffer 130 may be constructed in a particular way to accommodate specific data usage models. In one example embodiment, at least one producer thread 110 may have a dedicated buffer 130 that it may use to publish data to all consumer threads 140. In this context, the dedicated buffer may be implemented as a circular queue. In alternative embodiments, each producer thread 110 may have a separate, dedicated buffer 130. That buffer may be published to some or all of the consumer threads 140. For example, certain consumer threads 140 may subscribe to the data in the buffer. In such contexts, each of the subscribing consumer threads 140 will read all data published by the producer thread 110 at the dedicated buffer 130. As such, in this context each of the consumer threads 140 operates independently of the other consumer threads, rather than cooperatively operating to process the data in the buffer 130 by selectively processing different portions of the data published by the producer thread 110.

Increases in the amount of data in the input stream 120, increases in the complexity of processing required by the consumer threads 140, and the demands by people or systems relying on the producer-consumer workflow 102, can likewise increase the importance of ensuring high performance of the system. While computing resources provided by the computing system 600 can be scaled up or down from a pool of available computing resources (e.g., processing speed, memory, cache space, energy efficiency), the computing resources are finite, thus improvements to how the data structures and other aspects are processed can yield improvements to the functioning of the one or more computing systems 600.

Techniques that may be common in traditional computing operations (e.g., blocking processing to wait for other programs to finish a task or otherwise synchronize processing) are often unsuitable in operating in such High-Performance Computing (HPC) applications. In addition, HPC systems often use many computing threads running on multiple different processors. As the number of threads increases, so too do difficulties in synchronizing processing and maximizing the use of resources. These difficulties are explained, in part, by what is known in the art as "Amdahl's Law", which predicts that theoretical speedups of parallel processing are limited by the ability of the underlying processes to be parallelized. Improvements to HPC technologies can generally relate to improving the ability of processes to be parallelized and run in HPC settings.

Various kinds of queueing structures are commonly used in programming contexts. However, traditional implementations of queueing structure are not well-suited for use in HPC applications. For example, traditional queue management techniques (particularly for circular queues) are designed to ensure that all consumers of queued data are able to access that data until such time as the data is not required by any consumer. In cases where any consumer may consume any data from a queue (and where that data is only required to be consumed by a single consumer), a consumer that stalls or is otherwise delayed does not affect the overall queue size greatly, because other consumers may continue to pull and process data from the queue. However, in circumstances where all consumers must consume all data (e.g., in situation such as described above where all consumer threads 140 read all data from a dedicated buffer 130), in the event one such consumer stalls, queue entries may be retained indefinitely (or at least for as long as the consumer is stalled), because those entries are not yet read by the consumer. A result of such a stall could be that, because the producer thread continues to publish data to the buffer 130, the buffer may quickly fill, and therefore the producer may be prevented from storing further data in the buffer until the consumer is either able to recover and continue processing data, or is terminated. This has the additional effect of potentially stalling other consumer threads, which would wait for additional data published by the producer.

Queueing techniques disclosed herein overcome this challenge through carefully permitting queue entries to be overwritten, even when they have not yet been consumed by all consumers in a multi-threaded context.

Queue Structure

Figure 2:
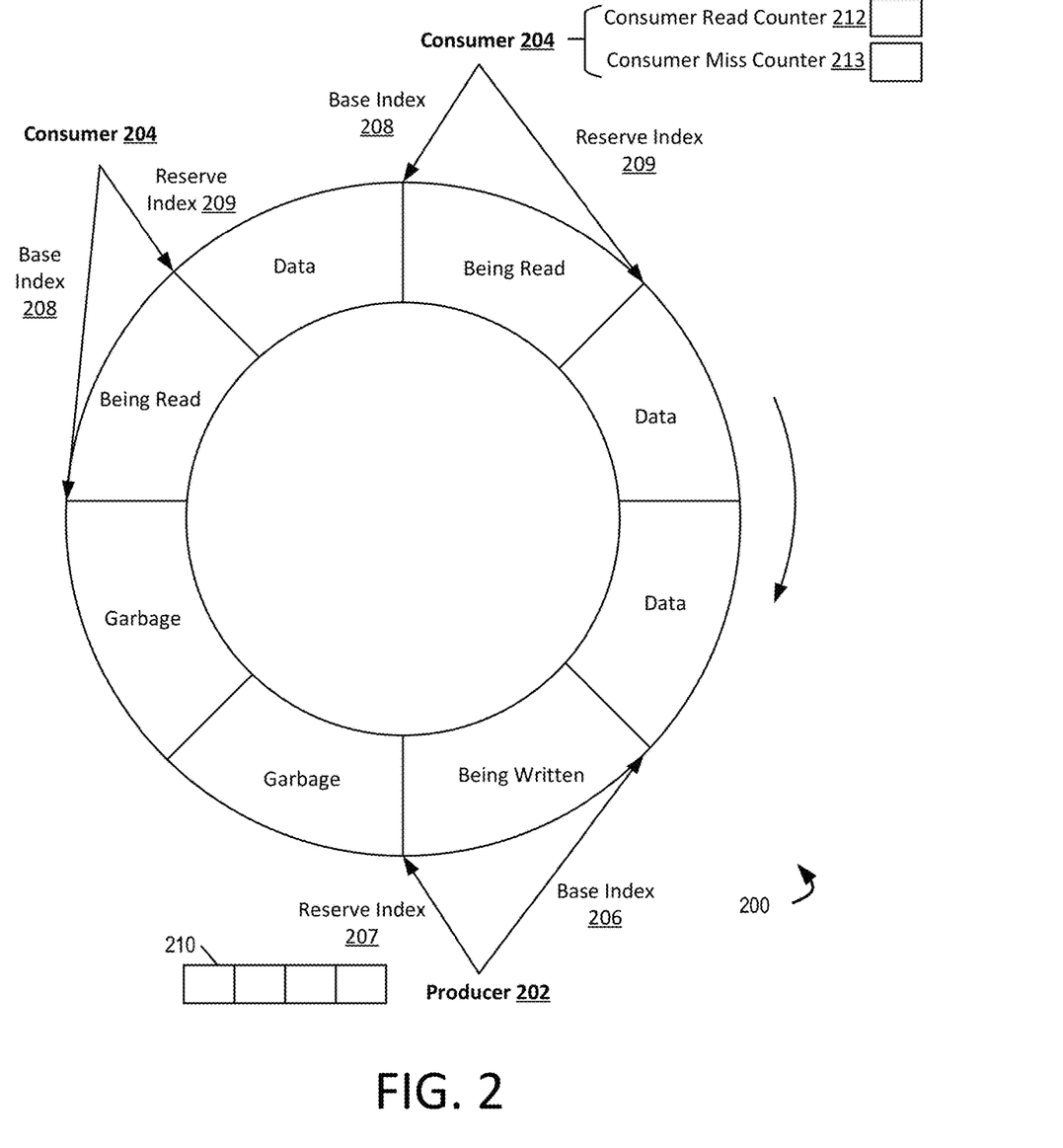
FIG. 2 illustrates an example queue with which aspects of the present disclosure can be implemented.

FIG. 2 illustrates an example logical diagram of a queue 200 useable to implement aspects of the present disclosure. In general, the queue 200 is implemented as a lock-free broadcast queue in which a single producer 202 generates data for an arbitrary number of consumers 204, each of which intend to read all data written to the queue 200 by the producer.

In particular embodiments, the producer may be implemented as a single producer thread (such as producer thread 110, of FIG. 1) or a plurality of coordinated producer threads. Similarly, each consumer 204 may be implemented as a single consumer thread (e.g., consumer thread 140 of FIG. 1) or a plurality of coordinated consumer threads.

In the example shown, the queue 200 is implemented as a circular queue (also known as a ring buffer). This may be accomplished, for example, by using an addressable memory space having a size that can be indexed using a modulo-2 indexing scheme. In other words, a predetermined size queue (such as a queue 1024 entries in length) may be addressed using continuously-incrementing binary index values which address appropriate locations within the queue by performing a modulo operation (in that case, modulo 1024, or using the last 10 bits of the index value) to locate the appropriate position within the queue. Accordingly, it is unnecessary to reset each of the pointers of the producer and consumers, but instead allow those (pre-modulo-operation) pointer values to continually increase.

The queue 200 may include entries of arbitrary size at each indexed location. Typically, the queue will include entries of a known length, such as a data word, cache line, or other standard-sized structure that may be accessed using an atomic operation or some small number of operations to ensure memory access speed. Accordingly, queue size will be determined by the queue entry size and the size of the index values used; any index value size could be used, but typically, a queue entry will have a size that allows for quick storage and retrieval, e.g., no greater than one cache line in size. Additionally, index values are typically sized such that atomic operations can be performed to modify the index values, e.g., using a 32- or 64-bit integer representation in a typical 64 bit central processing unit ("CPU") architecture.

In the example shown, the producer 202 maintains a producer base index pointer 206 and a producer reserve index pointer 207. The producer base index pointer 206 identifies a location in the queue at which the producer last successfully validated that it was able to write data. The producer reserve index pointer 207 is useable by the producer to reserve a predetermined amount of the queue, starting from the location of the base index point, at which data can be written. In other words, the distance between the base index pointer and the reserve index pointer corresponds to a size of a data chunk to be written to the queue 200.

In addition, the producer 202 may also have access to a write array 210. The write array 210 is an array indexed by the producer reserve index pointer 207, and useable to store data that will be copied into the queue 200.

In the embodiment shown, a plurality of consumers 204 are allowed to access the queue 200. Each of the consumers maintains a consumer base index pointer 208 and a consumer reserve index pointer 209. The consumer base index pointer 208 corresponds to a location at which the consumer has read all data in the queue up to that location. The consumer reserve index pointer 209 corresponds to a location within the queue identifying the data currently being read by the consumer. In particular, the data currently being read by the consumer corresponds to the data between the consumer base index pointer 208 and the consumer reserve index pointer 209.

In the various embodiments, a plurality of consumers may each independently consume data written by the producer. Each consumer may consume different amounts of data, or data at different rates. Accordingly, a rate of data being written by the producer to the queue 200, and each consumer's reading rate for data in the queue is independent of any other consumer.

Additionally, as discussed below, to coordinate each consumer with the producer, the producer will generally have read and write access to the producer base index pointer 206 and producer reserve index pointer 207, while consumers 204 may have read access to those pointers. Each consumer 204 will have read and write access to that consumer's corresponding consumer base index pointer 208 and consumer reserve index pointer 209. In some embodiments, other consumers and the producer 202 may have read access to those pointers; however, in other embodiments, other consumers and the producer may not have access to the consumer's pointers 208, 209 at all.

In accordance with the queue 200 described herein, data within the queue 200 may have any of a plurality of states. These may include, for example:

Data that is located in the queue between the producer reserve index pointer 207 and producer base index pointer 206 is unavailable for reading by consumers; such data may be in a state of currently being written.

Data that is located "behind" the producer base index pointer (i.e., at a position in the queue indexed to a lower value than that of the producer base index pointer) is valid data capable of being read by any consumer 204.

Data that is between a consumer reserve index pointer 209 and a consumer base index pointer 208 is currently being read by that consumer; it is noted that data may be in such a "currently being read" state based on the pointer positions and activities of more than one consumer 204 concurrently. Accordingly, such data may concurrently be both valid data that can be read by other consumers (as defined above), and data currently being read by a particular consumer.

Data that is in the queue 200, but is behind the last consumer's base index pointer 208, and ahead of the producer's reserve index pointer 207, is considered garbage, since no consumer or producer requires that data. That is, this data has been read by all consumers 204, and is available to be overwritten by the producer 202 without causing any consumer to subsequently detect a read miss.

Still further, in the example embodiment shown, each consumer 204 may be associated with a read counter 212 and a miss counter 213. In example embodiments, each time a read request is completed successfully by the consumer 204, that consumer will increment the read counter 212. If a read request is not completed successfully (e.g., because the consumer is overtaken by producer 202), the consumer can increment a miss counter 213. Accordingly, the read and miss counters for each consumer can be compared to determine the relative performance of each consumer, to identify slow consumers that are subscribed to the queue.

Alternatively, a common read counter and common miss counter could be implemented. In such instances, a general propensity to successfully (or unsuccessfully) read data from the queue 200 may be determined, although specific issues might not be as easily isolated to a particular consumer.

Figure 3:
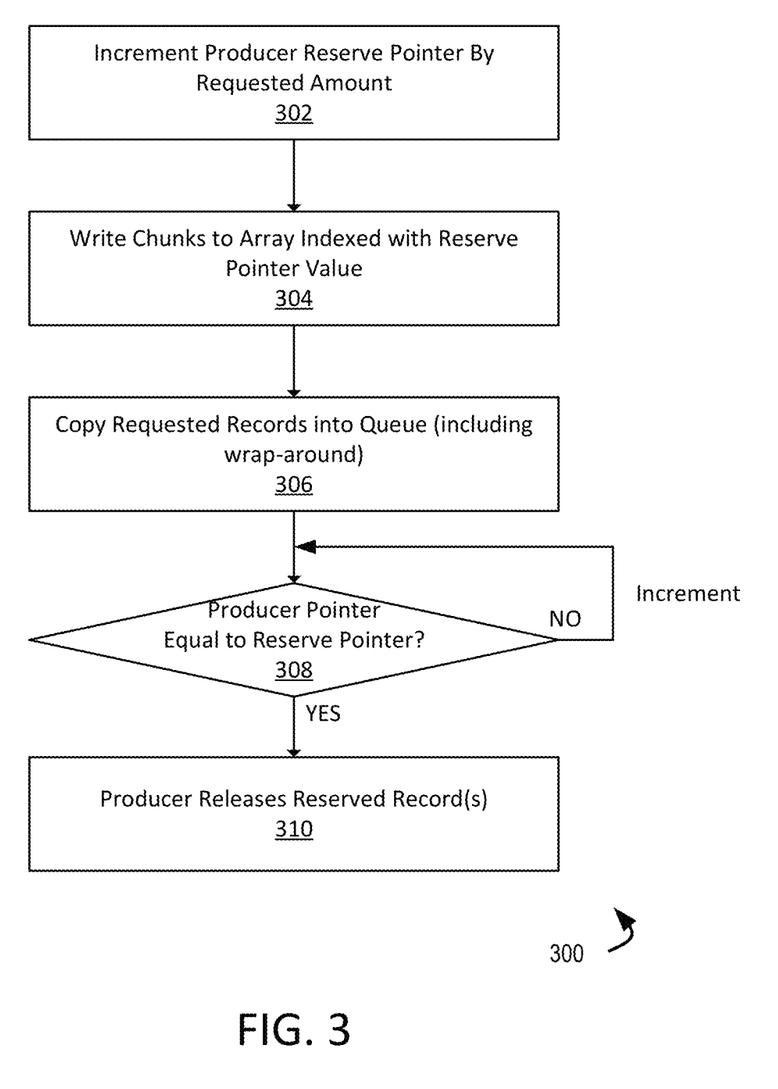
FIG. 3 illustrates a process of storing data in the queue of FIG. 2 by a publisher of data.
Figure 4:
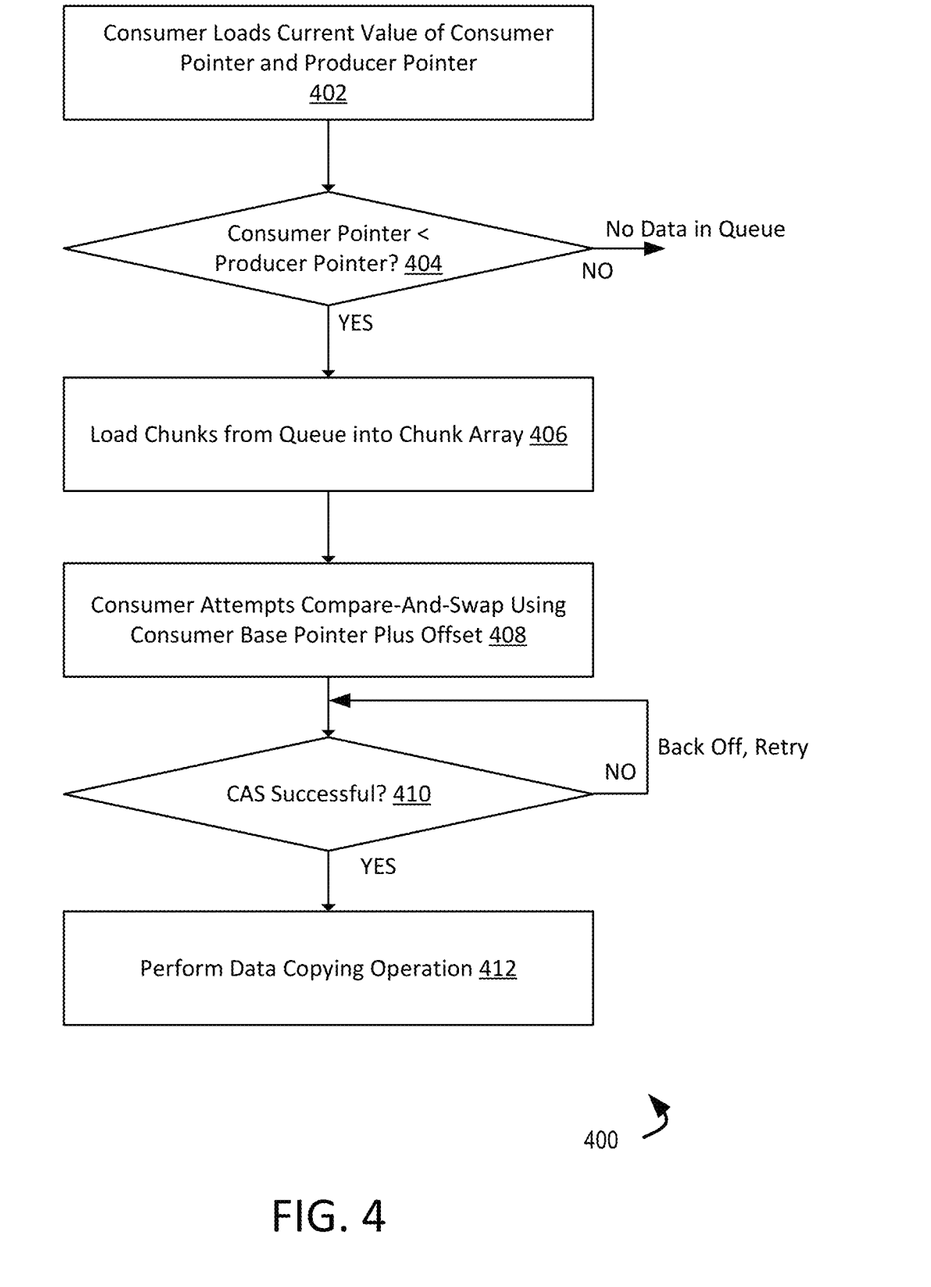
FIG. 4 illustrates a process of reading data from the queue of FIG. 2 by a subscriber to the data stored in the queue.
Figure 5:
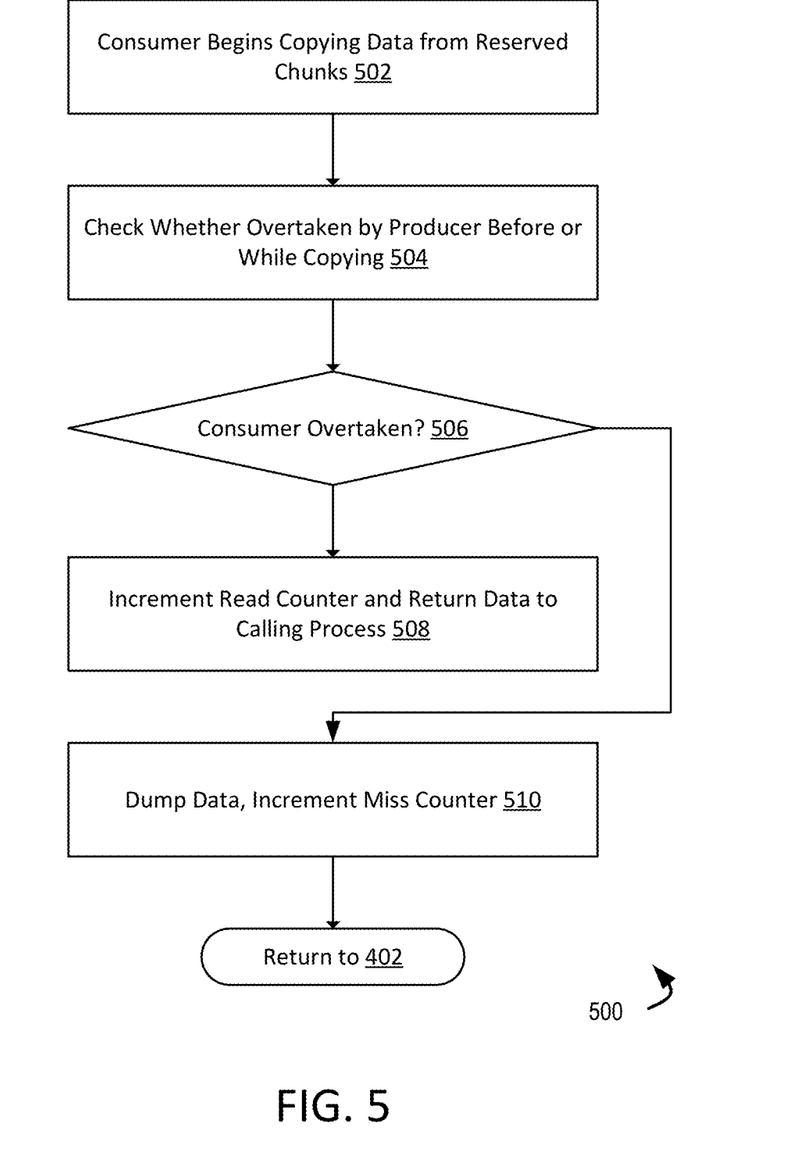
FIG. 5 illustrates a data copying operation useable as part of the process of reading data of FIG. 4.

In example embodiments, the queue can be initialized and interacted with according to the producer and consumer instructions, described in relation to FIGS. 3-5. Generally, the producer will continually write data in variable length data segments to the queue 200. Concurrently, each consumer will read data from the queue 200 at an independent rate. Upon completion of reading data, each consumer will assess if the consumer has been overtaken by the producer, thereby invalidating the data read from the queue by that consumer. In such instances, the consumer may discard the data and may either re-initialize or take some other action (e.g., start reading data from a last-known good data location, such as the producer reserve index pointer. Other possibilities exist as well.

Detailed discussion of queue interactions by the producer and consumers are described below in conjunction with FIGS. 3-5.

Producer Write Operation

FIG. 3 illustrates a queue writing process 300 performed by a producer, such as a producer thread 110, when writing to a queue, such as queue 200 of FIG. 2. In general, the producer thread maintains the producer base index pointer 202 and the producer reserve index pointer 204.

During operation, a producer may wish to write data of a predetermined size to be queue 200. To do so, the producer will first increment the producer reserve index pointer by an amount corresponding to the size of data the producer wishes to place in the queue 200 (step 302).

The producer may next write the data to be stored in the queue 200 to an array that is indexed with the value of the producer reserve index pointer (step 304).

The producer may then copy the requested records from the array into the queue 200 (step 306). This includes, to the extent the data approaches in and of the physical memory implementing the queue 200, wrapping the records are ounce to the beginning of the queue.

Upon completion of copying the requested records into the queue 200, the producer determines whether the producer base index pointer is equal to the producer reserve index pointer (operation 308). If the producer base index pointer is not equal to the producer reserve index pointer (e.g., because the producer base index pointer has not had been incremented), the producer base index pointer is incremented and reassessed relative to the producer reserve index pointer (e.g., during repeated performance of operation 308).

Once the producer determines that the producer base index pointer is equal to the producer reserve index pointer, operation proceeds by the producer releasing the reserved records in the queue (step 310). At this point, the producer has advanced to a next location in the two, and the written records are available for consumers to access from the queue 200 and ingest.

Consumer Read Operations

Referring now to FIGS. 4-5, operations of an example consumer are described. It is noted that, as mentioned above, a plurality of consumers may be able to access a same queue 200, with each of the plurality of consumers configured to read all data written by the producer.

FIG. 4 illustrates a process of reading data from the queue of FIG. 2 by a subscriber to the data stored in the queue.

In the embodiment shown, reading data from the queue 200 begins by the consumer loading a current value of the consumer base index pointer and a current value of the producer base index pointer (step 402). The consumer base index pointer is then compared to the producer base index pointer (step 404). If the consumer base index pointer is not less than the producer base index pointer, it is determined that there is no data in the queue 200 that is ready to be accessed. This is because, for example, the producer may be writing data to the queue, but has not yet advanced the producer base index pointer.

If the consumer base index pointer has a value less than a value of the producer base index pointer, there is data available in the queue for the consumer to read. Accordingly, the consumer will load chunks from the queue 200 into a chunk array (step 406). The number of chunks loaded from the queue into the chunk array can correspond to a next record in the queue, or an entire dataset currently available in the queue that has not yet been read by the consumer.

The consumer can then attempt to perform a compare-and-swap (CAS) operation using the consumer base index pointer adjusted by the number of chunks in the logical record (step 408). The compare-and-swap operation is an atomic operation that ensures up-to-date information is used for the values added together. The CAS operation will, if successful, replace the consumer base index pointer with an updated pointer offset from the consumer base index pointer by a number of chunks of data found to be read by the consumer.

If the compare-and-swap operation is not successful (as determined at operation 410), the consumer will retry the compare-and-swap after a predetermined period. The compare-and-swap may be unsuccessful, for example, because a number of chunks to be read has changed. The retrial allows any currently-executing write operations to the queue by a producer to complete (at least to the point that the producer base index pointer is updated).

If the compare-and-swap operation is successful (as determined that operation 410), consumer will precede it to perform a data copying operation (step 412). Details regarding an example data copying operation are provided below in conjunction with FIG. 5.

FIG. 5 illustrates a data copying operation 500 useable as part of the process of reading data of FIG. 4. The data copying operation 500 can be used, for example, to accomplish the data copying of step 412 of FIG. 4, e.g., in the event a compare-and-swap operation is successful.

In the example shown, a data copying operation is initiated by a consumer that begins copying data from a reserved set of chunks of the queue 200 (step 502). It is noted that this data copying process may take a number of computing cycles to complete, particularly depending upon the number of chunks to be copied as well as the other tasks performed on those chunks by the consumer as it proceeds. Accordingly, upon completion of copying the data, the consumer checks whether it was overtaken by a producer before or during the copying process (step 504). This can be accomplished, for example, by comparing a producer reserve index pointer to a consumer base index pointer.

If the producer reserve index pointer is greater than the consumer base index pointer, the producer may have either started ahead of the consumer in the queue or may have bypassed the consumer. To determine whether the producer bypassed the consumer (and therefore whether the consumer was overtaken during the data copying operation), the consumer can also compare the consumer base index pointer to the producer base index pointer that was read by the consumer at the beginning of a data reading process (e.g., at step 402). If the consumer base index pointer was not less than the producer base index pointer at a beginning of a data reading process, then the producer was at a location equal to or behind the consumer in the queue; if the reserve index pointer is also greater than the consumer base index pointer, it can be determined that the consumer has been overtaken by the producer.

If the consumer was overtaken by the producer, the data copied from the queue would be considered invalid, because it is uncertain whether that data corresponds to the previously-stored data or data that was added to the queue by the producer while the producer was overtaking the consumer. Accordingly, the consumer will dump the data and consider that data to be invalid (step 510). The consumer can then increment a miss counter. In example embodiments, the miss counter corresponds to a global miss counter shared by all consumers, to provide an overall indication of a number of queue misses that occur. In other embodiments, the miss counter can be specific to a particular consumer.

In some embodiments, the consumer will have a capability of recovering from missing data in the queue, e.g., by restarting a hung operation, or otherwise continuing operation with some data loss (e.g., at least the invalidated data due to being overtaken by the producer). For example, in some cases, a consumer may be re-initialized by setting its consumer base index pointer to a current producer base index pointer; this allows the consumer to restart operation with any new data stored in the queue by the producer.

Example Effects

Referring to FIGS. 1-5 overall, it is recognized that the methods and systems described herein have a number of advantageous effects relative to existing queueing technologies, particularly when implemented in a multithreaded environment in which multiple consumers subscribe to data published by a single producer. In particular, each consumer's ability to continue consuming data from the queue is independent of other consumers subscribed to the queue. Stalled, or slow-executing consumers may fail or drop data (e.g., by being overrun by the producer) but (1) will not cause delay of the producer or other consumers of data in the queue, and (2) may be implemented to pick up from some known-good location in the queue (e.g., the producer's base index pointer) and therefore resume operation. At worst, only the stalled or slow consumer will fail.

Additionally, because each consumer is independent of the other consumers, the only inaccessible portion of the queue to any consumer is that portion being written by the producer (e.g., between the producer base index pointer and the producer reserve index pointer). Accordingly, the amount of data and time that a lock is placed on queue data is minimized.

Computing System

Figure 6:
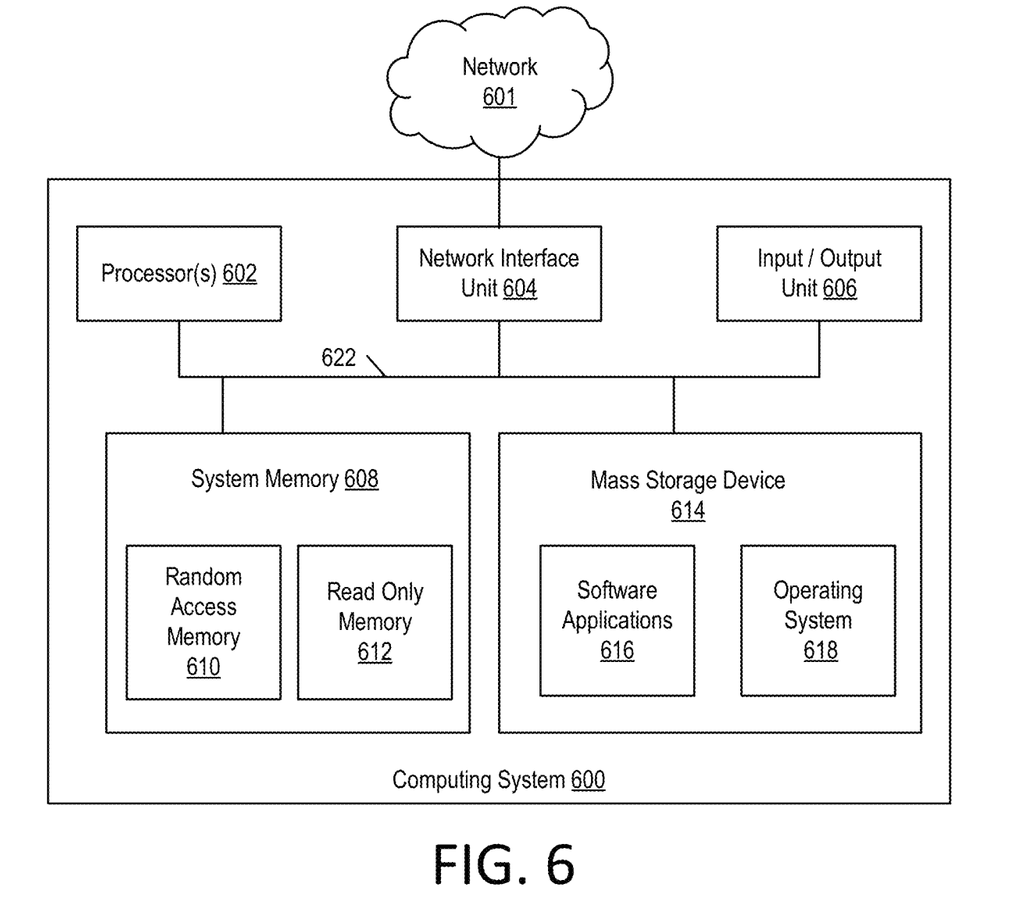
FIG. 6 illustrates an example block diagram of a computing system.

FIG. 6 illustrates an example block diagram of a virtual or physical computing system 600. One or more aspects of the computing system 600 can be used to implement the queue 200, store instructions described herein, and preform operations described herein.

In the embodiment shown, the computing system 600 includes one or more processors 602, a system memory 608, and a system bus 622 that couples the system memory 608 to the one or more processors 602. The system memory 608 includes RAM (Random Access Memory) 610 and ROM (Read-Only Memory) 612. A basic input/output system that contains the basic routines that help to transfer information between elements within the computing system 600, such as during startup, is stored in the ROM 612. The computing system 600 further includes a mass storage device 614. The mass storage device 614 is able to store software instructions and data. The one or more processors 602 can be one or more central processing units or other processors.

The mass storage device 614 is connected to the one or more processors 602 through a mass storage controller (not shown) connected to the system bus 622. The mass storage device 614 and its associated computer-readable data storage media provide non-volatile, non-transitory storage for the computing system 600. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 600.

According to various embodiments of the invention, the computing system 600 may operate in a networked environment using logical connections to remote network devices through the network 601. The network 601 is a computer network, such as an enterprise intranet and/or the Internet. The network 601 can include a LAN, a Wide Area Network (WAN), the Internet, wireless transmission mediums, wired transmission mediums, other networks, and combinations thereof. The computing system 600 may connect to the network 601 through a network interface unit 604 connected to the system bus 622. It should be appreciated that the network interface unit 604 may also be utilized to connect to other types of networks and remote computing systems. The computing system 600 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the computing system 600 can store software instructions and data. The software instructions include an operating system 618 suitable for controlling the operation of the computing system 600. The mass storage device 614 and/or the RAM 610 also store software instructions, that when executed by the one or more processors 602, cause one or more of the systems, devices, or components described herein to provide functionality described herein. For example, the mass storage device 614 and/or the RAM 610 can store software instructions that, when executed by the one or more processors 602, cause the computing system 600 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A system comprising:
   one or more processors; and
   a memory storing instructions that, when executed by the one or more processors, cause the one or more processors to:
   store, in a ring buffer in the memory, data from a producer;
   receive a data read request from a consumer from among a plurality of consumers, wherein each of the plurality of consumers is subscribed to independently read all data from the ring buffer;
   after obtaining data from a location in the ring buffer in response to the data read request, determine if the location has been overrun by the producer;
   if it is determined that the location has been overrun by the producer, discard the obtained data by the consumer and restart the consumer to read new data from a different location in the ring buffer by setting a consumer base index pointer associated with the consumer to a current location of a producer base index pointer associated with the producer; and
   if it is determined that the location has not been overrun by the producer, consume the obtained data.

2. The system of claim 1, wherein the instructions determine whether the location was overrun by the producer either before or during execution of the data read request.

3. The system of claim 1, wherein the instructions further cause the consumer to, if it is determined that the location has been overrun by the producer, log the overrun using a miss counter.

4. The system of claim 1, wherein the producer comprises a producer thread and the consumer comprises a consumer threads from among a plurality of consumer threads subscribing to the data stored by the producer in the ring buffer.

5. The system of claim 1, further comprising a producer reserve index pointer, the producer base index pointer identifying a last location in the ring buffer at which data is stored by the producer.

6. The system of claim 5, wherein the producer reserve index pointer is offset from the producer base index pointer, and wherein a reserved portion of the ring buffer between a location referenced by the producer base index pointer and a second location referenced by the producer reserve index pointer is reserved by the producer.

7. The system of claim 1, wherein the ring buffer resides in the memory.

8. The system of claim 7, further comprising a producer reserve index pointer in the memory, each of the producer base index pointer and the producer reserve index pointer being writable by the producer.

9. The system of claim 8, further comprising a consumer reserve index pointer, each of the consumer base index pointer and the consumer reserve index pointer being writable by the consumer.

10. The system of claim 9, wherein the producer base index pointer is readable and not writable by the consumer.

11. The system of claim 1, further comprising a chunk array storing a copy of the data read from the ring buffer on behalf of the consumer.

12. The system of claim 1, wherein the instructions further cause the consumer to, if it is determined that the location has not been overrun by the producer, increment a read counter associated with the consumer.

13. A method comprising:
   storing, in a circular queue, data from a producer;
   receiving a data read request from a consumer from among a plurality of consumers, wherein each of the plurality of consumers is subscribed to independently read all data from the circular queue;
   copying data from a location in the circular queue that is adjacent to last-read data by the consumer;
   after copying the data in response to the data read request, determining whether the location has been overrun by the producer;
   upon determining that the location has not been overrun by the producer, consuming the copied data and incrementing a read counter; and
   upon determining that the location has been overrun by the producer, discarding the copied data by the consumer and restarting the consumer to read new data from a different location in the circular queue by setting a consumer base index pointer associated with the consumer to a current location of a producer base index pointer associated with the producer.

14. The method of claim 13, wherein determining whether the location has been overrun by the producer includes comparing the consumer base index pointer to a producer reserve index pointer.

15. The method of claim 14, wherein the producer reserve index pointer comprises a pointer set by the producer to reserve capacity in the circular queue of a predetermined size, wherein the producer reserve index pointer is offset from the producer base index pointer by at least the predetermined size.

16. The method of claim 13, further comprising:
   receiving a second data read request from a second consumer from among the plurality of consumers subscribed to read data from the circular queue;
   copying second data from a second location in the circular queue that is adjacent to last-read data by the second consumer;
   after copying the second data in response to the second data read request, determining whether the second location has been overrun by the producer;
   upon determining that the second location has been overrun by the producer, discarding the second data by the second consumer and incrementing a miss counter associated with the second consumer.

17. The method of claim 16, wherein copying the data and copying the second data from the second location occur concurrently by the consumer and the second consumer, respectively.

18. The method of claim 13, wherein storing the data from the producer comprises:
- incrementing a producer reserve index pointer by a requested amount corresponding to a size of the data to be stored in the circular queue, thereby reserving records of the circular queue;
- writing data to an array indexed with the producer reserve index pointer value;
- copying the data from the array into the records of the circular queue;
- incrementing the producer base index pointer until it is equal to the producer reserve index pointer; and
- upon the producer base index pointer equaling the producer reserve index pointer, releasing the records for access by the plurality of consumers.

19. A system comprising:
- one or more processors; and
- a memory storing instructions that, when executed by the one or more processors, cause the one or more processors to:
- store, in a ring buffer in the memory, data from a producer at a location between a producer base index pointer and a producer reserve index pointer;
- receive a data read request from a consumer from among a plurality of consumers, wherein each of the plurality of consumers is subscribed to independently read all data from the ring buffer, the data read request identifying data in the ring buffer adjacent to a consumer base index pointer;
- after obtaining data from a location in the ring buffer between the consumer base index pointer and a consumer reserve index pointer in response to the data read request, determine if the location of the obtained data has been overrun by the producer by comparing the consumer base index pointer to the producer reserve index pointer;
- if it is determined that the location of the obtained data has been overrun by the producer, discard the obtained data by the consumer and proceed to read new data from a different location in the ring buffer by setting the consumer base index pointer to a current location of the producer base index pointer; and
- if it is determined that the location of the obtained data has not been overrun by the producer, consume the obtained data.

20. The system of claim 19, further comprising:
- if it is determined that the location of the obtained data has been overrun by the producer, increment a miss counter; and
- if it is determined that the location of the obtained data has not been overrun by the producer, increment a read counter associated with the consumer.

* * * * *